US011453520B2

(12) United States Patent
Rydlewski et al.

(10) Patent No.: US 11,453,520 B2
(45) Date of Patent: Sep. 27, 2022

(54) DEVICE FOR MANUFACTURING A POUCH ACCOMMODATED IN A WRAPPING

(71) Applicant: Teepack Spezialmaschinen GmbH & Co. KG, Meerbusch (DE)

(72) Inventors: Thomas Rydlewski, Düsseldorf (DE); Sergey Anokhin, Gladbach (DE); Klaus Baltes, Bergheim (DE); Stefan Lambertz, Hurth (DE); Hans Knops, Krefeld (DE)

(73) Assignee: Teepack Spezialmaschinen GmbH & Co. KG, Meerbusch (DE)

( * ) Notice: Subject to any disclaimer, the term of this patent is extended or adjusted under 35 U.S.C. 154(b) by 0 days.

(21) Appl. No.: 17/316,904

(22) Filed: May 11, 2021

(65) Prior Publication Data

US 2021/0354867 A1  Nov. 18, 2021

(30) Foreign Application Priority Data

May 12, 2020 (EP) .................... 20174043

(51) Int. Cl.
  *B65B 51/14* (2006.01)
  *B65B 29/02* (2006.01)
  (Continued)

(52) U.S. Cl.
  CPC .......... *B65B 51/14* (2013.01); *B29C 66/3452* (2013.01); *B65B 11/28* (2013.01);
  (Continued)

(58) Field of Classification Search
  CPC ....... B65B 11/28; B65B 11/48; B65B 29/028; B65B 51/14; B65B 51/16; B65B 51/30; B29C 66/3452
  (Continued)

(56) References Cited

U.S. PATENT DOCUMENTS

| 2,083,124 A | 6/1937 | Rambold |
| 2,348,201 A * | 5/1944 | Barnett .................. B65B 29/04 |
| | | 53/134.1 |

(Continued)

FOREIGN PATENT DOCUMENTS

| DE | 2334701 A1 | 1/1974 |
| DE | 29609717 U1 | 8/1996 |

(Continued)

OTHER PUBLICATIONS

European Search Report for European Patent Application No. 20174043.8 dated Oct. 27, 2020, 5 pages.

*Primary Examiner* — Stephen F. Gerrity
(74) *Attorney, Agent, or Firm* — Dorsey & Whitney LLP

(57) ABSTRACT

The present invention relates to a device for manufacturing a pouch containing a brewable material accommodated in a wrapping, comprising a pouch manufacturing device adapted to manufacture a water-permeable pouch containing brewable material, and comprising a sealing station with two sealing jaws movable relative to one another for sealing the pouch in the wrapping placed in a U-shape around the pouch, wherein the sealing jaws are configured to form longitudinal seals (L) lying opposite one another and a transverse seal (Q) extending transversely thereto on the wrapping, wherein at least one sealing jaw comprises first and second sealing jaw elements each configured to form one of the longitudinal seals (L) and a segment of the transverse seal (Q).

10 Claims, 7 Drawing Sheets

(51) Int. Cl.
*B65B 51/30* (2006.01)
*B65B 11/28* (2006.01)
*B65B 11/48* (2006.01)
*B29C 65/00* (2006.01)

(52) U.S. Cl.
CPC ............ *B65B 11/48* (2013.01); *B65B 29/028* (2017.08); *B65B 51/30* (2013.01)

(58) Field of Classification Search
USPC .................................................... 53/228, 234
See application file for complete search history.

(56) References Cited

U.S. PATENT DOCUMENTS

| | | | | |
|---|---|---|---|---|
| 4,346,545 A | * | 8/1982 | Crescenzo et al. | B65B 11/48 53/234 |
| 4,779,400 A | * | 10/1988 | Hoskinson et al. | B65B 9/087 53/374.8 |
| 4,869,051 A | * | 9/1989 | Shifley et al. | B65B 9/02 53/228 |
| 10,315,837 B2 | * | 6/2019 | Rivola et al. | B65B 11/48 |
| 2007/0186509 A1 | | 8/2007 | Ou et al. | |

FOREIGN PATENT DOCUMENTS

| | | | | |
|---|---|---|---|---|
| EP | 1153833 A1 | 11/2001 | | |
| EP | 1479612 A1 | 11/2004 | | |
| EP | 2231479 B1 | 8/2011 | | |
| EP | 2572996 A1 | 3/2013 | | |
| EP | 2626318 A1 | 8/2013 | | |
| GB | 2164316 A | * | 3/1986 | ............ B65B 11/42 |
| JP | 2016005960 A | 1/2016 | | |
| NL | 8304244 A | * | 7/1984 | ............... B65B 9/02 |
| WO | 0162600 A1 | 8/2001 | | |
| WO | 2009101686 A1 | 8/2009 | | |
| WO | 2011007432 A1 | 1/2011 | | |
| WO | 2012117308 A1 | 9/2012 | | |

* cited by examiner

DEVICE FOR MANUFACTURING A POUCH ACCOMMODATED IN A WRAPPING

CROSS-REFERENCE TO RELATED APPLICATION

This application claims priority to European Patent Application No. 20174043.8, filed May 12, 2020 and entitled "Device For Manufacturing a Pouch Accommodated in a Wrapping", which is hereby incorporated by reference herein in its entirety for all purposes.

FIELD

The present invention relates to a device for manufacturing a packaging unit comprising a pouch containing a brewable material provided in a typically aroma-tight wrapping.

BACKGROUND

A corresponding device with the features from the preamble is known from EP 2 231 479 B1. In this previously known device, the pouch is first placed in a wrapping station between opposite legs of a wrapping material supplied as a flat web. The pouch is placed on the web, which is folded around the pouch and cut off from a wrapping material supplied so that a piece of wrapping material of prefabricated length accommodates the pouch within it. By folding the wrapping material, an edge of the wrapping of the pouch is already formed. However, there is a need to form a U-shaped seal seam so that the wrapping is circumferentially closed around the pouch and an aroma-tight package of the brewable material within the pouch can result.

This brewable material is usually tea or other infusible material of dried powder or leaves, the quality and taste of which may be affected by environmental influences so that the previously mentioned aroma-tight packaging may be necessary. This also applies to the present invention.

In the aforementioned prior art, the U-shaped sealing seam is formed by a sealing device which has a plurality of sealing units on the outer circumferential surface of a carousel, each of which has sealing jaws which can be pivoted towards one another, which receive the wrapping together with the pouch and are closed in the course of a stepwise rotary movement of the carousel in order to seal the U-shaped edges of the wrapping by welding during the rotary movement of the carousel and to deliver the thus closed wrapping to another station.

SUMMARY

This embodiment is based on the consideration that, in relation to other stations of the previously known device, the sealing of the pouch in the wrapping by forming weld seams requires a longer dwell time in the sealing station than in the previous stations. Thus, the individual work steps in the sealing station can be divided in time by rotating the carousel without interrupting or disturbing the cycle time of the entire device.

For the effective sealing of the wrapping, in particular by way of welding, it is necessary to bring the wrapping with its edges between the sealing jaws, to place the sealing jaws against the wrapping, to introduce a sufficient amount of heat into the wrapping in order to melt it in such a way that the mutually abutting webs of the wrapping melt and weld together. Due to the heat applied and the necessary cooling time, this seal is not immediately stable so that the packaging unit consisting of the pouch and the wrapping can usually only be further processed after a certain cooling time has been observed.

Since the device for manufacturing the packaging unit is a device for the mass production of consumables, it is important to have a fast cycle time and an economical production of the packaging unit. The present invention aims to improve the previously known device in this respect and, in particular, to provide a sealing station that allows faster sealing of the pouch in the wrapping.

The device according to the invention comprises a pouch manufacturing device in a manner known. This does not have to differ from the pouch manufacturing device described in EP 2 231 479 B1. Alternatively, it can also be configured according to EP 2 626 318 A1, EP 1 479 612 A1, EP 2 572 996 A1 or EP 1 153 833 A1. In this context, the pouch manufacturing device can be designed such that, together with the pouch, a thread is also connected thereto, the other end of which is provided with a label, as is known, for example, from EP 2 231 479 B1.

The device according to the invention further has a sealing station for enclosing the pouch, if necessary together with the thread and the label, in a wrapping. This sealing station is usually configured such that the pouch is enclosed in the wrapping in an aroma-tight manner. The wrapping is known as such, for example, from DE 296 09 717 U1. In the configuration described there, too, the wrapping is formed by wrapping the pouch, if necessary together with the thread and the label, wherein this unit consisting of the wrapping and the pouch is sealed to form a U-shaped seam. For this purpose, the sealing station can join the opposite layers of the wrapping by means of welding. However, other types of joining such as knurling or gluing are also conceivable. These types of joining can also be applied in combination with each other.

In the sealing station according to the invention, at least one sealing jaw, usually each of the two sealing jaws, has a first and a second sealing jaw element. Each of the sealing jaw elements of a single sealing jaw is configured to form one of the longitudinal seals and a section of the transverse seal. Usually, two sealing jaw elements are provided which, in combination, form a U-shaped, almost closed sealing surface and which are applied against the wrapping material from one side in order to apply opposite legs of the film web, separated by a fold, against one another and press them between the two sealing jaws. Thus, the sealing surface formed by the single sealing jaw element, which abuts the wrapping for sealing, is preferably L-shaped.

In contrast to the prior art, in the solution according to the invention, each individual sealing jaw provided on one side of the corresponding wrapping is formed at least in two parts, preferably exactly in two parts. The first and the second sealing jaw elements can be moved in different directions towards and away from the wrapping. Thus, a space for inserting the wrapping for sealing the same and for removing the sealed packaging unit can be produced in a different manner than in the prior art, in which this space is formed by pivoting the two sealing jaws.

In the solution according to the invention, the first and second sealing jaw elements of each individual sealing jaw can be moved translationally and/or rotationally to form the corresponding space. In particular, the two sealing jaw elements can be spaced apart from each other in order to insert the wrapping between them. With the sealing jaws open, the first and second sealing jaw elements will typically already be approaching each other after the wrapping with the pouch is provided therebetween between the substantially opposing first sealing jaw elements of an upper and a lower sealing jaw and second sealing jaw elements of the upper and lower sealing jaw. Insofar as reference is made to the upper and lower sealing jaws, this is done primarily to distinguish between the individual components of the sealing jaws. The upper and lower sealing jaws enclose the wrapping between them during sealing. The first and second sealing jaw elements can be provided on the upper and lower sealing jaws, respectively. The first, second and, if necessary, a third or fourth sealing jaw element are accordingly located on one side of the wrapping during sealing.

Preferred configurations are those in which an identical configuration of the sealing jaws is realized, both on the upper side and on the lower side of the wrapping.

The sealing jaw elements are preferably L-shaped, wherein one leg forms the sealing surface for longitudinal sealing and another leg forms a segment of the sealing surface for transverse sealing. During sealing, the two legs forming the segments of the transverse seal usually abut against each other or rest closely against each other so that, despite the division of the sealing jaws into a first and a second sealing jaw element, a transverse seal can be produced which runs continuously from one corner to the other corner.

Accordingly, the solution according to the invention offers the advantage of rapid and thus economical sealing of the wrapping. The wrapping can be inserted more quickly into the space between the sealing jaws, sealed there and removed from the space after sealing.

For example, if the wrapping is moved by a rotating transport wheel to a sealing position in which the sealing jaws compress the wrapping material between them, the space accommodating the base of the wrapping folded around the pouch may be formed by spaced apart first and second sealing jaw elements on the upper side and the lower side. Already when approaching the sealing position, the respective sealing jaw elements are moved towards each other so that they take up the wrapping material between them and finally, at the end of the infeed movement, not only cooperate with each other to complete a U-shaped sealing surface, but also press the wrapping material between them. The transport wheel and the sealing station are usually operated with the cycle time of the pouch manufacturing device.

Preferably, the respective sealing jaw elements are pivotally mounted, for which purpose a sealing jaw pivot arm is provided which carries the first or the second sealing jaw element. The pivot axis of this sealing jaw pivot arm extends obliquely to the longitudinal and transverse seals and accordingly transversely to the previously mentioned bars of the L-shaped sealing surface. Preferably, this inclined position is such that the pivot axis runs exactly at an angle of 45° to the longitudinal and transverse seals, which are usually provided at right angles to each other. However, the angle may deviate from this preferred orientation by +/−15°, preferably +/−10°, particularly preferably +/−5°.

The sealing jaw pivot arm can be driven by a torque transmitted by the pivot axis. For example, the sealing jaw pivot arm can be arranged on the shaft of a motor that defines the pivot axis.

The inclined position of the pivot axis causes the two legs of the L-shaped sealing jaw elements to move away from both the longitudinal edge and the transverse edge of the wrapping when pivoting. The longitudinal edge is formed by the opposite longitudinal edges of the legs, whereas the transverse edge usually runs at right angles to them and is provided opposite the fold. With regard to good kinematics, it is preferable to provide for the pivot axis to be offset with respect to a sealing plane in which the wrapping is arranged in the sealing position. While the sealing surface during sealing usually extends parallel to a plane containing the pivot axis, the pivot axis is clearly offset from this plane.

The sealing jaw pivot arm is usually essentially L-shaped, with one end of the sealing jaw pivot arm pivotally mounted about the pivot axis and the other end carrying the associated sealing jaw element. Between these two ends, a connecting rod is usually engaged, which is generally connected to the pivot arm in a hinged manner. The connecting rod is driven via a drive shaft, to which the connecting rod is arranged eccentrically. As usual, the connecting rod is freely rotatable around an eccentric of the drive shaft. The drive shaft usually runs parallel to the pivot axis, since not only the sealing jaw pivot arm is driven via the drive shaft, but also a counter jaw pivot arm which interacts with one of the first or second sealing jaw elements and, together with this sealing jaw element, effects sealing of the wrapping material. This counter jaw pivot arm is also pivotally mounted, but with regard to a pivoting movement in the opposite direction when the drive shaft is driven, on an opposite side in relation to the pivot points of the connecting rods. The pivot axis associated with the sealing jaw, hereinafter referred to as the sealing jaw pivot axis, accordingly occupies the points of engagement of the connecting rods between itself and the other pivot axis, hereinafter referred to as the counter jaw pivot axis.

In the preferred configuration described above, in which each sealing jaw is formed by two jaw elements formed in an L-shape, the device preferably has two drive shafts, to each of which a drive unit is assigned as a motor. Each of the two drive shafts accordingly has an independent drive. This drive is preferably a servomotor.

The respective drive shaft is provided for driving one of the sealing jaw elements and one of the counter jaw elements. This counter jaw element is the counter jaw element which cooperates with the corresponding sealing jaw element for pressing the wrapping. A single drive shaft is then preferably assigned to the upper and lower jaw elements and moves them towards each other so that the two jaw elements, i.e. the sealing jaw element and the counter jaw element, are moved in a synchronized manner by the single drive shaft. The second drive shaft similarly provides the other pair of jaw elements that press the wrapping between them. Each drive shaft runs parallel to the pivot axes of the sealing jaw and counter jaw pivot arms associated with the drive shaft.

The two drive shafts are preferably aligned at right angles to each other. The same applies to the pivot axes assigned to the respective pairs, of which four are preferably provided in order to pivotally mount the sealing jaw element and the counter jaw element of the first pair towards and away from each other and to pivotally mount the sealing jaw element and the counter jaw element of the second pair in the same way.

BRIEF DESCRIPTION OF THE DRAWINGS

Further details and advantages of the present invention will be apparent from the following description of an embodiment in conjunction with the drawing. Therein:

FIG. 1 shows a top view of a packaging unit consisting of a pouch and film.

DETAILED DESCRIPTION

Figure 1:
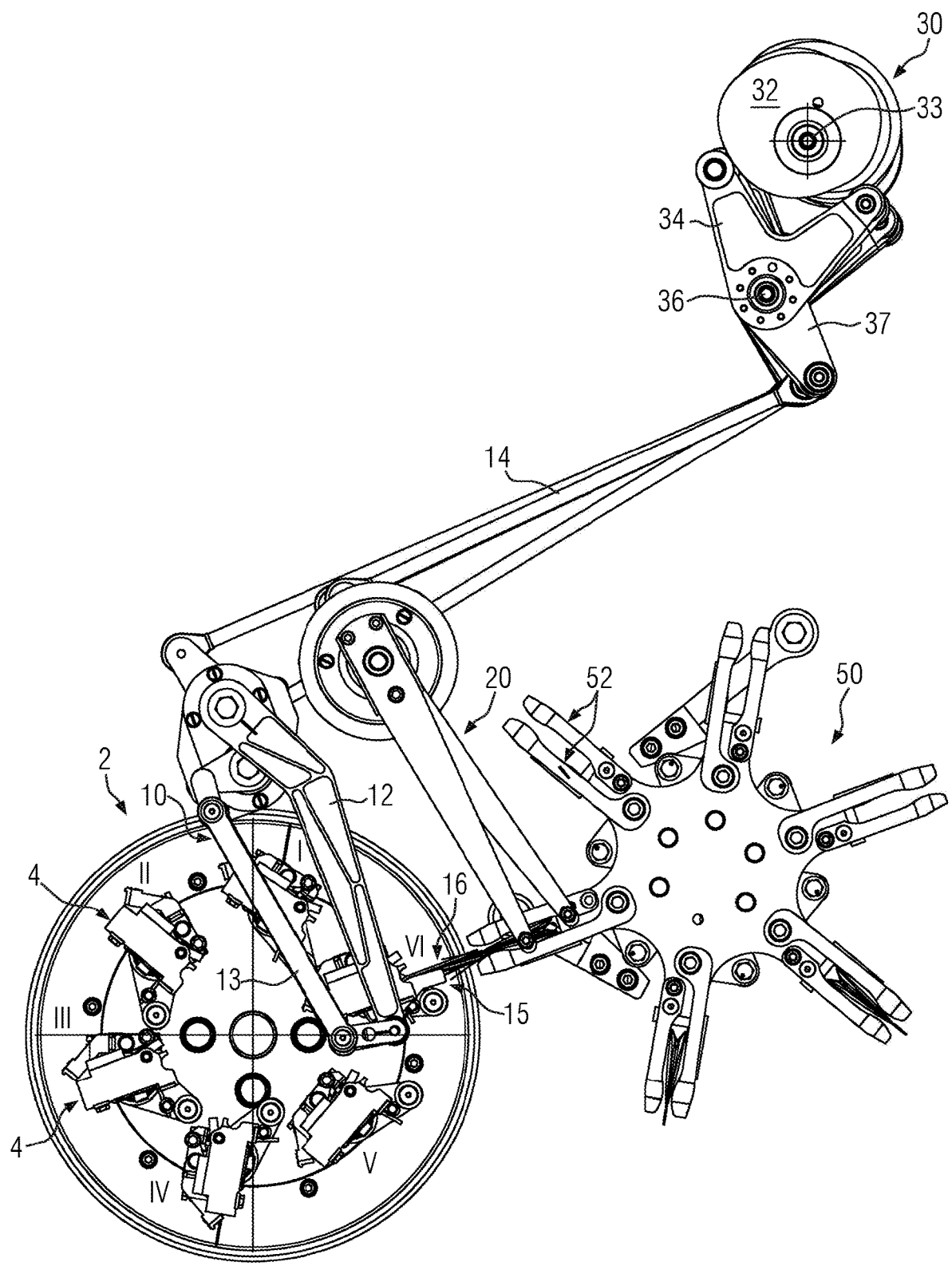
FIG. 1 shows a side view of essential parts of an embodiment of a device for manufacturing a wrapped pouch.

The embodiment shown in FIG. 1 has a pouch manufacturing device identified by reference sign 2 and a sealing station identified by reference sign 100.

The pouch manufacturing device 2 comprises a carousel with several receptacles 4 rotating about an axis for accommodating a water-permeable wrapping, which is formed to form the pouch containing a brewable material and is usually connected to a thread and a label. With regard to the individual stations and their configuration, reference can be made to the prior art, for example EP 2 231 479 B1 or WO 01/62600 A1. Reference signs I to VI in FIG. 1 identify various positions in which the receptacle 4 can be located in order to receive and process the various components of the finished pouch or the to-be-finished pouch. Elements acting in this process are not shown for the sake of clear representation. In position VI, the pouch is finished.

Figure 2:
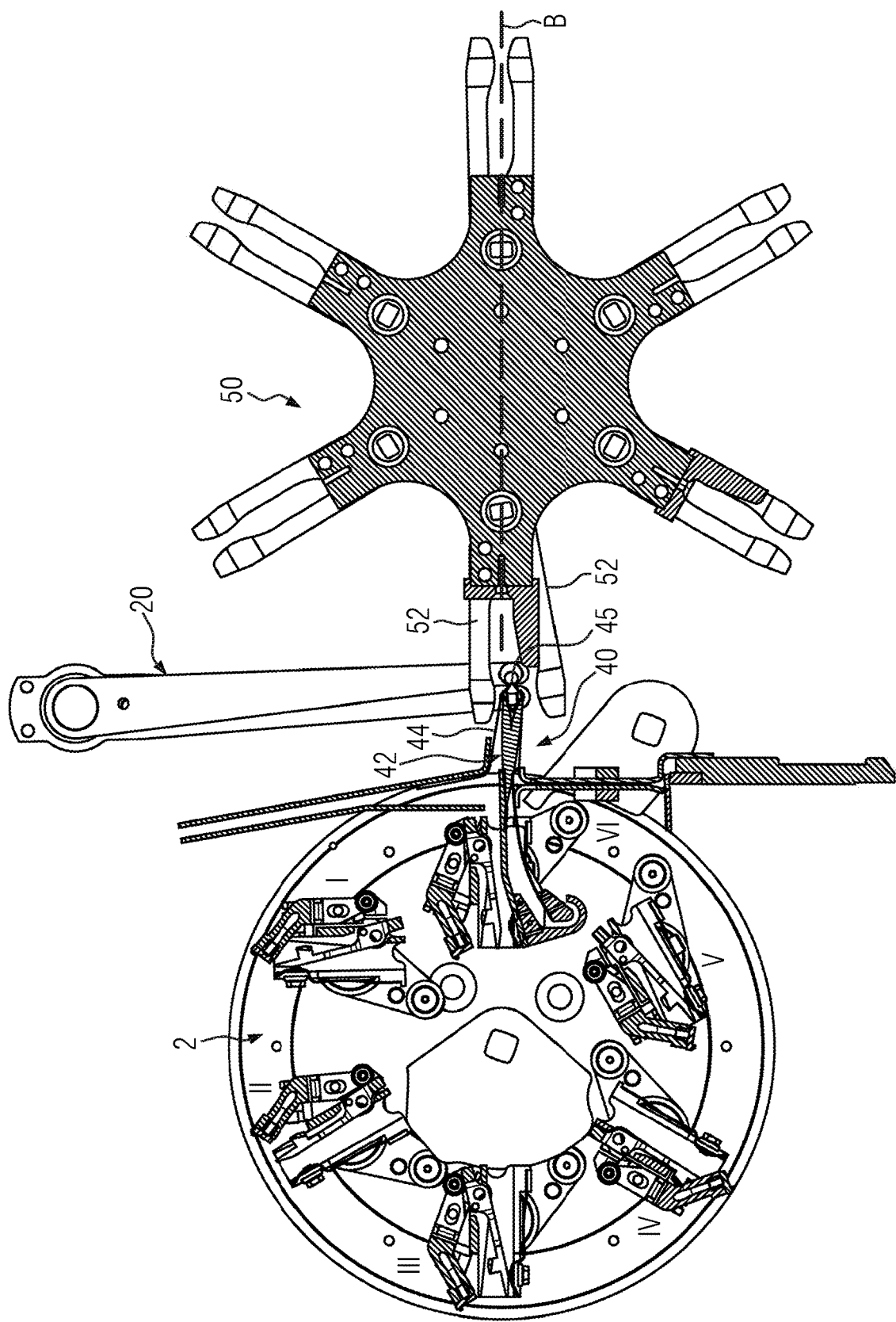
FIG. 2 shows an enlarged view of the pouch manufacturing device shown in FIG. 1 as the pouch and film are pushed out.

FIGS. 1 and 2 show elements of a pouch handling device identified by reference sign 10 and a wrapping material handling device identified by reference sign 20. The wrapping material of the embodiment shown is an aroma-tight film. Thus, in the description below, reference will be made to a film handling device 20. The pouch handling device 10 comprises two approximately parallel extending arms 12, 13, which are hingedly connected to each other and coupled to a common drive device 30 via coupling rods 14. This common drive device 30 has different cam discs 32 which are non-rotatably fixed on a common drive shaft 33 of the drive device 30 and are coupled to pick-ups 34 in which the outer circumferential surfaces of the cam discs 32 roll in each case, wherein the pick-ups 34 are each mounted pivotally on a common bearing axis 36 and are provided with a lever 37 which is hingedly connected to the associated coupling rod 14. The coupling rods 14 act on the arms 12, 13 via levers.

The drive device 30 actuates both the individual components of the pouch handling device 10 and the components of the film handling device 20. Thus, both handling de-vices 10, 20 are provided with a common drive and are forcibly synchronized.

As can be seen from FIG. 2, a film 40 shown schematically in FIG. 1 together with a pouch 42 are pushed out of the pouch manufacturing device 2 and towards a transport wheel 50, wherein a fold 45 formed by folding the material of the film 40 and formed between two legs 44 of the film 40 runs ahead and the pouch 42 runs behind. The film handling device 20 engages the edge of the film 40. The pouch 42 is pushed out from behind by actuating a clamping shoe 15 with a clamping spring 16 by moving the clamping shoe 15 together with the clamping spring 16 together with the front ends of the front and rear pouch handling arms 12, 13 radially away from the pouch manufacturing device 2. At the end of this movement, the pouch 42 is placed in the wrapped film 40 and clamped between clamping arms 52 of the transport wheel 50.

The sealing station 100 has sealing jaws identified by reference signs 102 and 108, wherein the sealing jaw 102 shown at the bottom in FIGS. 3 to 9, is formed from a first sealing jaw element 104 and a second sealing jaw element 106. Similarly, the upper sealing jaw 108 shown thereabove is formed of two jaw elements which are hereinafter referred to as counter jaw elements 110 and 112. As shown in particular in FIG. 6, each sealing jaw element 104, 106 is L-shaped in the top view and has a long leg 113 and a short leg 114 extending at right angles thereto. The long legs 113 each form a longitudinal seal by which the opposite legs 44 are joined at their longitudinal side. The two short legs 114 together form a sealing surface of each of the sealing jaws 102, 103, which is adapted to form a transverse seal and produce it on the film 40 so as to seal the transverse side of the film material opposite the fold 45. The longitudinal seals and the transverse seals allow the interior of the film package to be hermetically sealed. The fourth side is sealed by the fold 45.

The sealing jaw element 104 and the counter jaw element 110 (in each case, the left part of the sealing jaws according to FIGS. 3 to 9) are driven by a common drive 115 in the form of a servomotor. For this purpose, connecting rods are provided eccentrically to a drive shaft 116 of the drive 115, of which the connecting rod provided adjacent to the drive 114 is associated with the counter jaw 110 and is accordingly hereinafter designated as the counter jaw connecting rod 118, and the other connecting rod, which is provided on the side of the counter jaw connecting rod 118 opposite to the drive 115, is designated and identified as the sealing jaw connecting rod 120.

This sealing jaw connecting rod 120 is freely rotatable and eccentrically mounted on the drive shaft 116. The other end of the sealing jaw connecting rod 120 is hingedly attached at a pivot point identified by reference sign 122 to a sealing jaw pivot arm 124, which carries the sealing jaw element 104 at one end and is pivotally mounted at its other end about a pivot axis 126, hereinafter identified as the sealing jaw pivot axis.

In a corresponding manner, the counter jaw connecting rod 118 is pivotally connected to a counter jaw pivot arm 128 which supports the counter jaw 110 and is pivotally mounted at its opposite end on a counter jaw pivot axis 130. With reference to the orientation of the sealing jaws 102, 108 according to the illustrations, in particular in FIGS. 5 and 9, reference is also made below to the upper sealing jaw 108 and lower sealing jaw 102. The lower sealing jaw 102 consists of the lower sealing jaw elements 104, 106. The upper sealing jaw 108 consists of the upper sealing jaw elements 110, 112.

Figure 5:
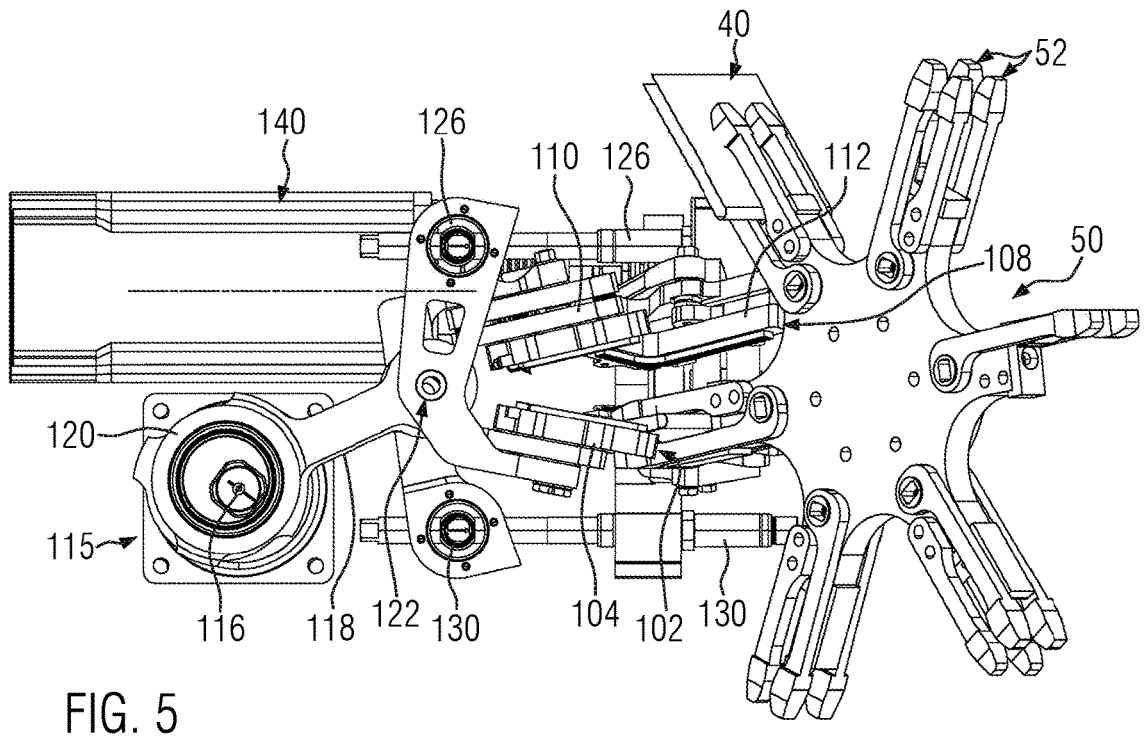
FIG. 5 shows a side view of the sealing station in the phase illustrated in FIGS. 2 and 3.
Figure 7:
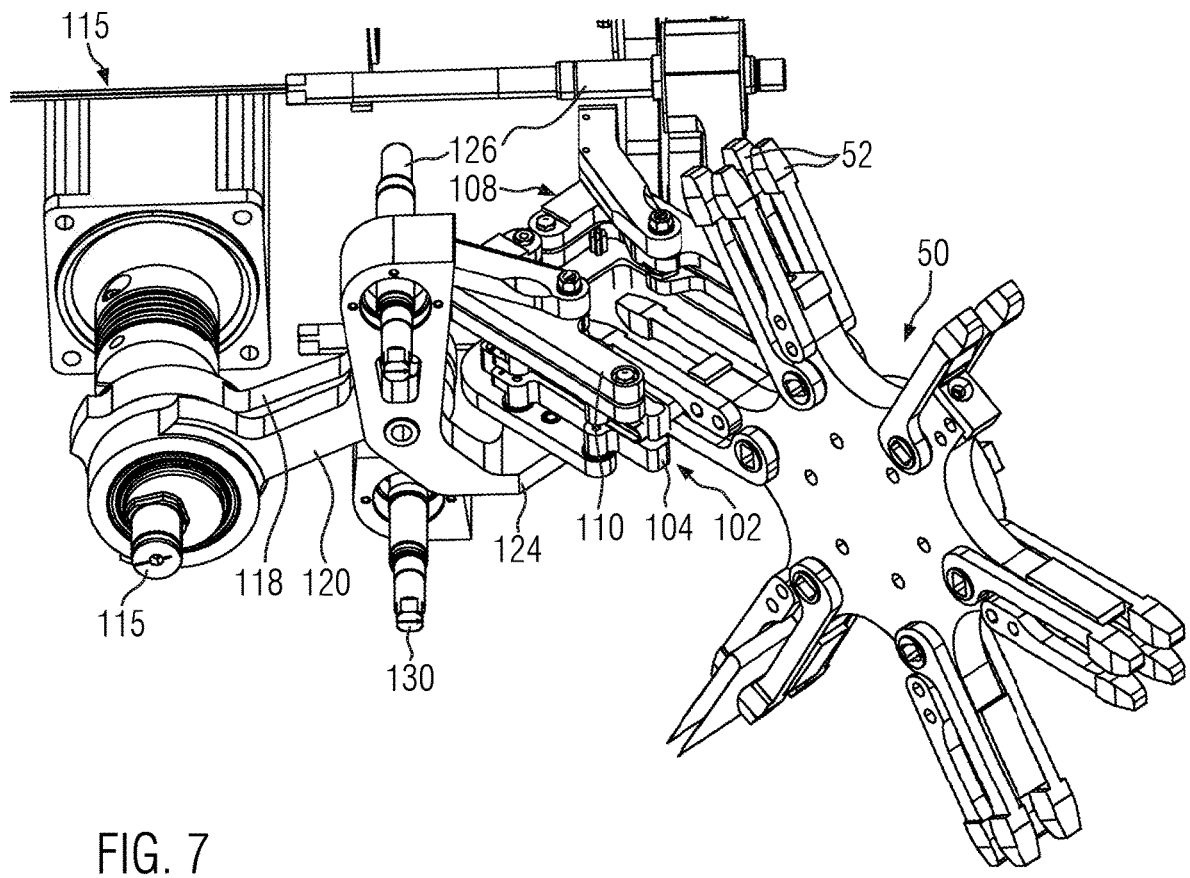
FIG. 7 shows a view according to FIG. 2 during sealing of the wrapping.
Figure 9:
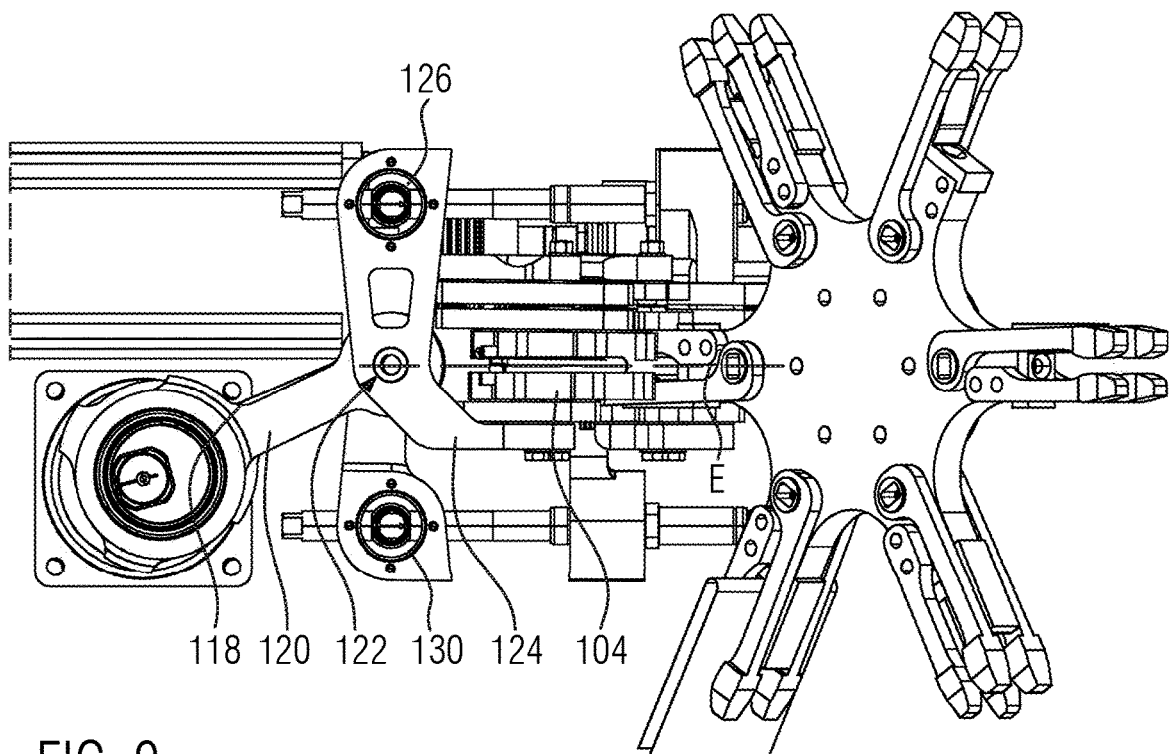
FIG. 9 shows a representation according to FIG. 4 in the phase according to FIGS. 5 and 6, and FIG. 10

The two pivot axes 126, 130 are provided between the sealing jaws 102, 108 and the drive shaft 116—as can be seen in particular in the side views according to FIGS. 5 and 9. A sealing plane identified in FIG. 9 by reference sign E, in which the film 40 is located when the seal is formed, extends at right angles to a connecting line joining the two pivot axes 126, 130. Approximately halfway along this line are the pivot points, of which only the pivot point 122 of the sealing jaw connecting rod 120 can be seen in the drawing.

Figure 4:
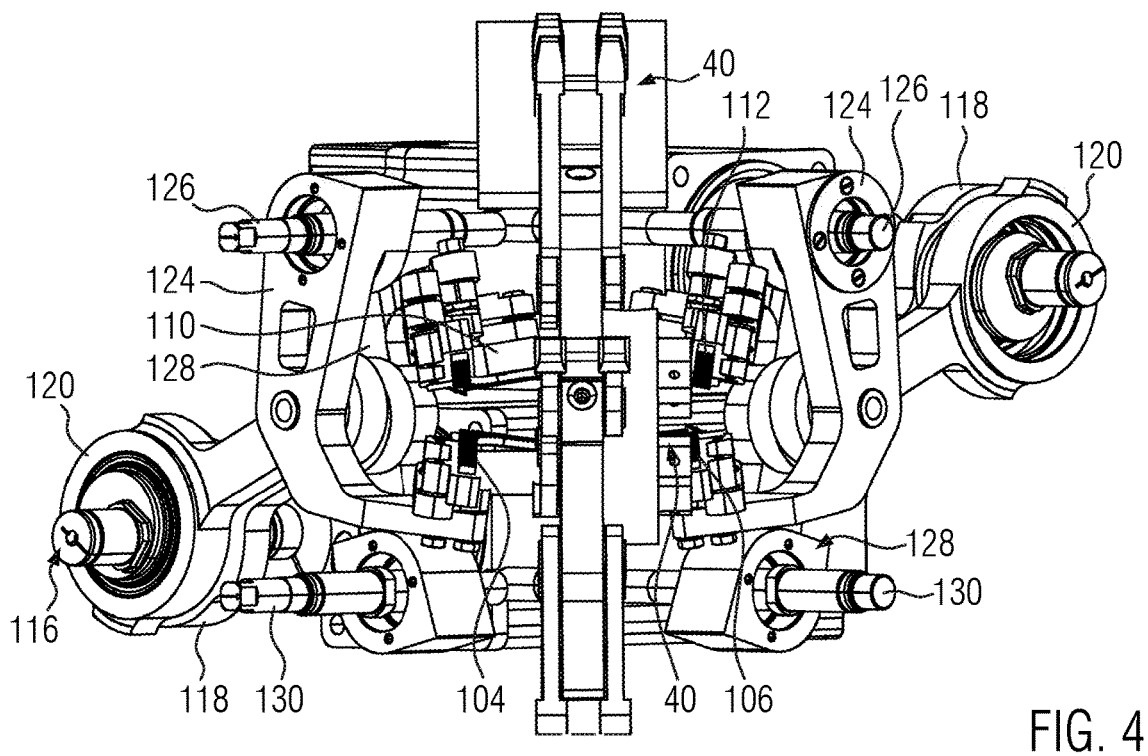
FIG. 4 shows a top view of the embodiment of the sealing station at right angles to the rotary axis of the transport wheel according to FIG. 2 in the phase illustrated in FIG. 2.

The elements for sealing the film 40, namely the sealing jaw element 106 and the counter jaw element 112, which can be seen on the right in FIG. 4, are also mounted in a supported and movable configuration in the manner described above. As can be seen in particular from FIG. 6, two drives 115, 140 are provided, the drive shafts 116, 142 of which extend at right angles to one another. The drives 115, 140 are provided overlapping each other, whereby a relatively compact structure is given. The essential components of the sealing station 100 are basically mirror-inverted about an axis A, wherein the axis A intersects the point of intersection of the two drive shafts 116, 152, passes through the separation between the short legs 114 and extends at a right angle to a rotary axis of the transport wheel 50.

As can be derived from the above description, toggle levers are provided for each of the first and second pairs of sealing jaw elements 104, 110; 106, 112, wherein the toggle lever to the sealing jaw element 104 comprises the sealing jaw connecting rod 120 and the toggle lever to the counter jaw element 110 comprises the counter jaw connecting rod 118. In this context, the two connecting rods 118, 120 are rotatably mounted about and supported by the common drive shaft 116. They are mounted eccentrically to this drive shaft 116. However, the eccentrics are angularly offset from each other.

Figure 3:
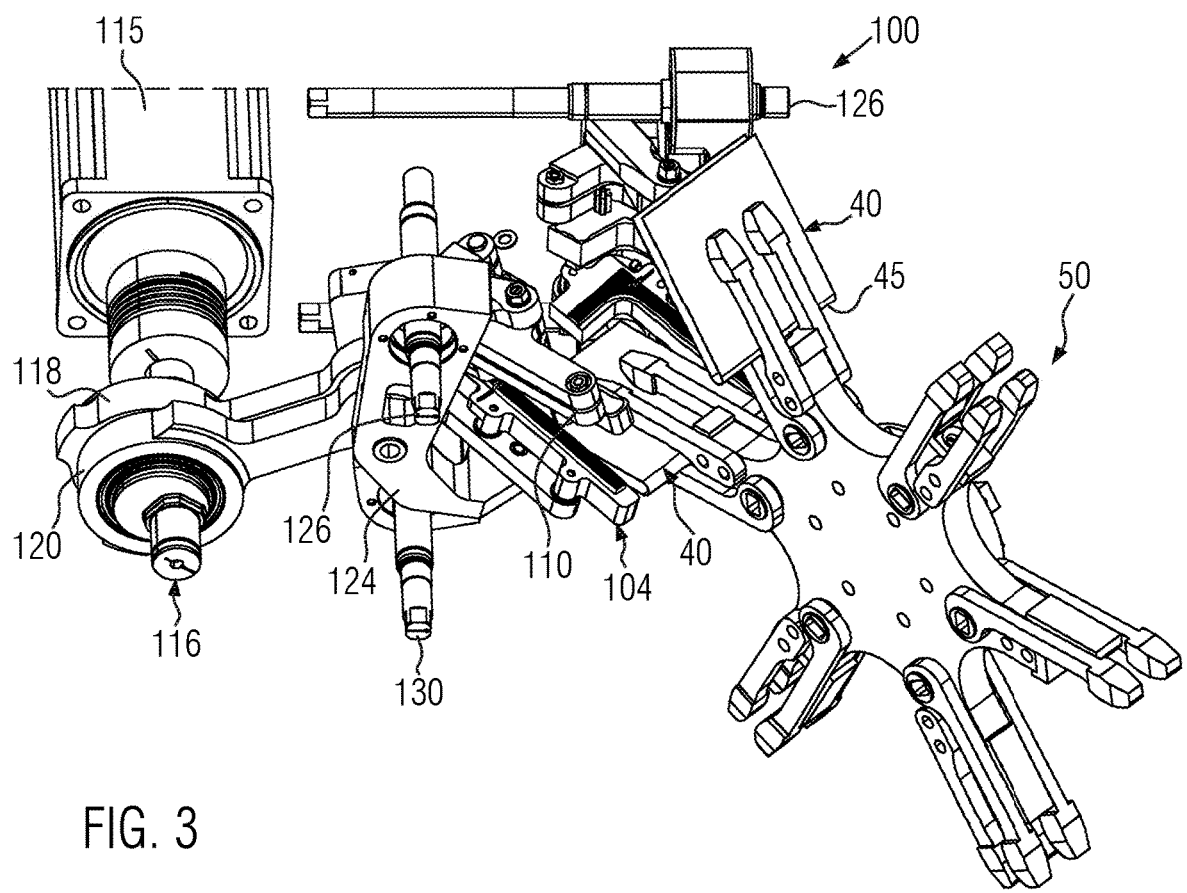
FIG. 3 shows a perspective top view of the sealing station of the embodiment according to FIG. 1 with the sealing jaws open.

FIGS. 3 to 5 show a phase in the operation of the sealing station 100 prior to the insertion of the upper film 40 in FIGS. 3 to 5 between the sealing jaws 102, 108. The sealing jaws 102, 108 are open. Specifically, in the view according to FIG. 4, the sealing jaw elements are the sealing jaw element 104 pivoted downward and to the left, the sealing jaw element 106 pivoted downward and to the right, the counter jaw element 110 pivoted upward and to the left, and the counter jaw element 112 pivoted upward and to the right. This pivoting movement is effected by the respective toggle levers. As FIG. 5 illustrates, the larger radii of the respective eccentrics to the respective connecting rods 118, 120 are located on the side of the drive shaft 116 opposite the sealing jaws 102, 108. The long legs 113 run parallel to axis 1, the short legs 114 at right angles thereto, and the pivot axes 126, 130 are each inclined 45° thereto. The pivot arms 124, 128 are accordingly pivoted almost maximally in the direction of the drive shaft 116. The space between the sealing jaws 102, 108 allows the folded film 40 to be inserted without colliding with the sealing jaws 102, 108. This insertion is effected by rotation of the transport wheel 50 which is stopped when the folded film 40 has reached the sealing plane E. The folded film 40 is then inserted into the sealing jaws 102, 108. While the film 40 is approaching sealing plane E, the sealing jaws 102, 108 are already closed by clockwise rotation of the drive shaft 116 according to FIGS. 5 and 9. In these figures, reference is made to the drive shaft 116. The other drive shaft 142 is driven in the opposite direction.

The sealing position is shown in FIGS. 6 to 9. The sealing jaws 102, 108 are in contact with each other. Specifically, the sealing jaw element 104 abuts the counter jaw element 110 and the sealing jaw element 106 abuts the counter jaw element 112. Thus, each pair of mutually associated jaw elements 104, 110; 106, 112 is closed with the enclosure of the film 40. Furthermore, the short legs 114 of the respective jaw elements 104, 106, 110, 112 are in contact with each other.

As illustrated in particular in FIG. 9, the sealing jaw connecting rod 120, which is assigned to the lower sealing jaw 102, is in its extended position. A straight line intersecting the pivot point 122 and the drive shaft 116 accordingly passes through the eccentric, which is connected to the drive shaft 116 in a non-rotatable manner, in its maximum radius. The sealing jaw connecting rod 120 is accordingly supported solely radially and by the mounting of the drive shaft 116.

The counter jaw connecting rod 118, on the other hand, is located in the direction of rotation of the drive shaft 116 until it reaches the sealing position even before its extended position, namely approximately 30° before its extended position. In other words, the respective sealing jaw element 104, 106 has already reached its maximum possible position (with reference to the representation according to FIG. 9), while the clockwise rotation of the drive shaft 116 leads to a further considerable approach of the counter jaw element 110. In the embodiment shown, the torque applied by the servomotor as drive 115 determines the contact pressure force between the two jaw elements 104, 110 or 106, 112. The torque tapped at the drive 115 is used to set the contact pressure force. The torque corresponds exactly to the contact pressure force. In particular, there are no springs or other compression means between the drive 115 and the sealing surfaces of the individual jaw elements 104, 106, 110, 112 which are located against each other. Since the sealing jaw element is in the extended position of the corresponding toggle lever and, accordingly, the load is transferred radially to the drive shaft via the associated sealing jaw connecting rod 120 alone, the torque to be tapped via the motor power is determined solely by the contact pressure force of the counter jaw element 110, whereby the control of the contact pressure force via the servomotor is simplified and made more precise.

Figure 6:
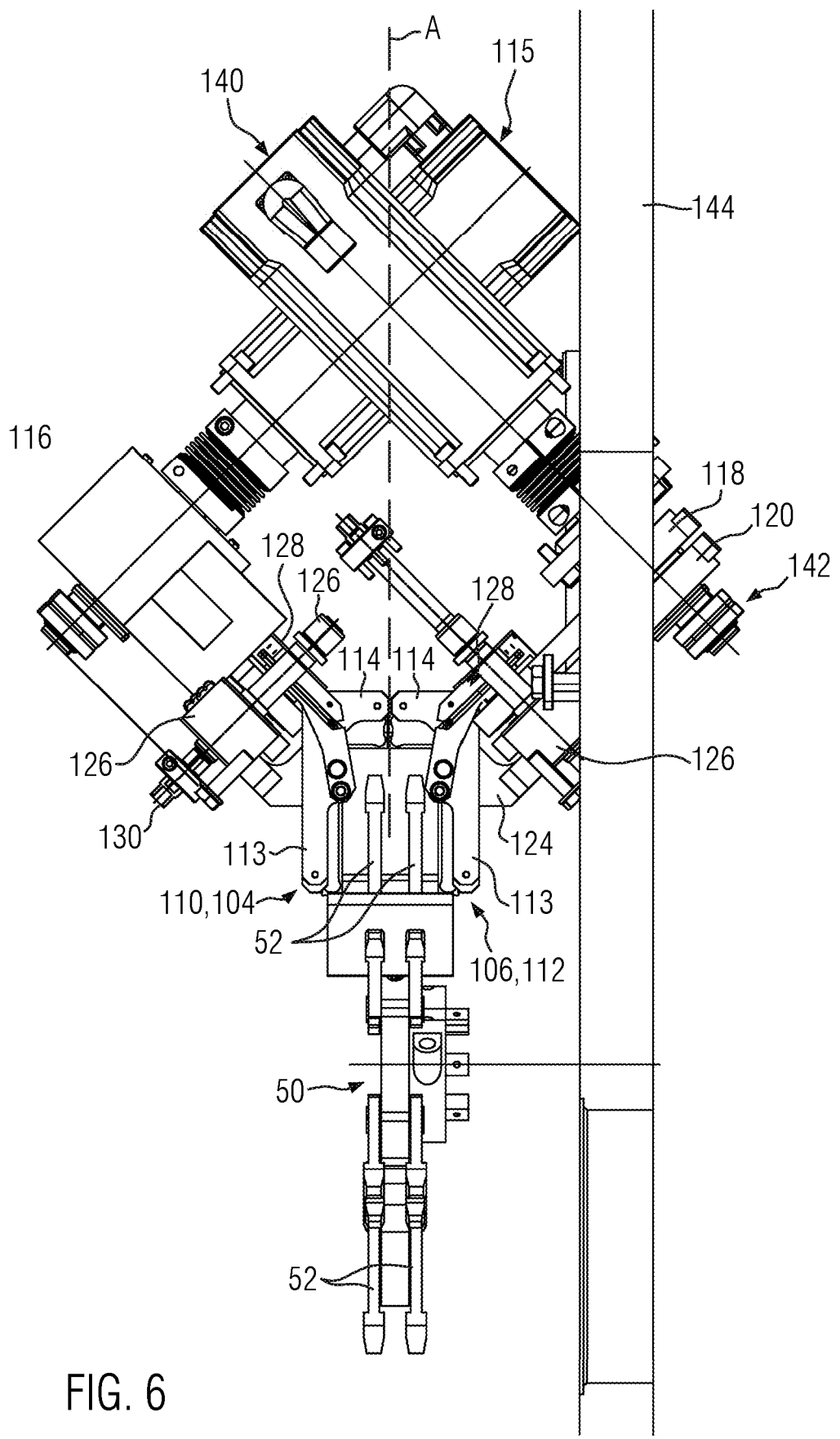
FIG. 6 shows the sealing station in a top view of the sealing jaws during sealing.
Figure 8:
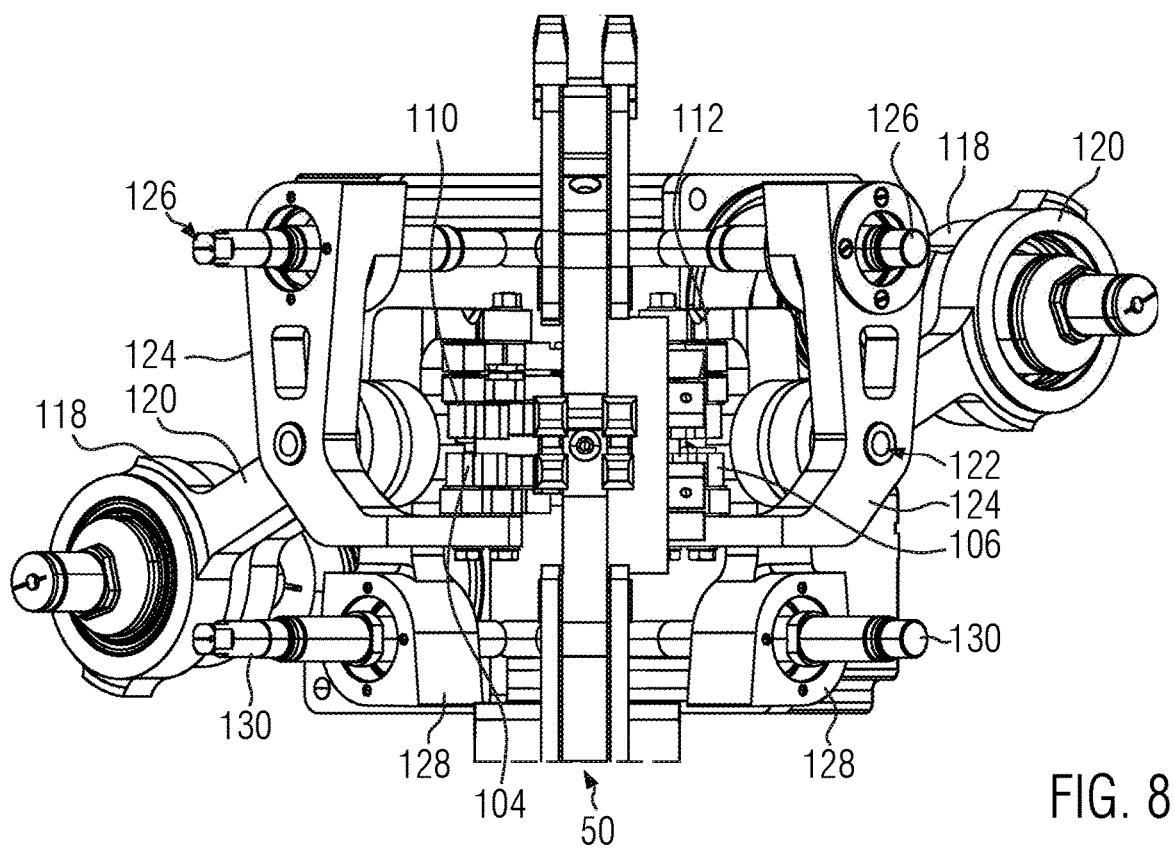
FIG. 8 shows a representation according to FIG. 3 in the phase according to FIG. 7.

FIG. 6 also illustrates the location of the components of the sealing station 100 relative to a wall 144 of a machine which typically exposes, on its outside (in FIG. 6, on the left), the individual stations with their functional components interacting with the pouch or pouch material, a label, or a thread for connecting the pouch material to the thread. On the outside of the wall 144, the operator of the device can also access the components for setting up the machine or troubleshooting after opening a door that is usually at least partially trans-parent and covers the components. Behind the wall 144, typically, the gearbox or motor of the machine is located. Obviously, the drive shaft 142 and the connecting rods 118, 129 connected thereto pass through this partition wall 144.

Figure 10:
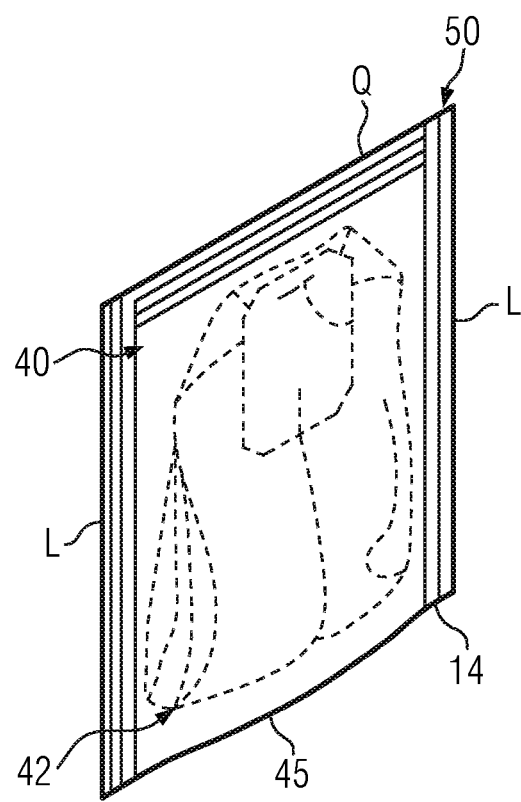

FIG. 10 illustrates the package as described above, consisting of a wrapping identified by reference sign 150, which is a circumferential wrapping accommodating the pouch 42 illustrated in dotted form with thread and label and enclosing it in an aroma-tight manner. The wrapping 150 has a first broad side which is closed by the fold 45. Longitudinal seals L extend at right angles from this fold. At the end of these longitudinal seals L there is a transverse seal Q, which runs parallel to the fold 45. The longitudinal and transverse seals L, Q merge or intersect.

REFERENCE SIGN LIST 2 pouch manufacturing device
4 receptacle
10 pouch handling device
12 front pouch handling arm
13 rear pouch handling arm
14 coupling rod
15 clamping shoe 16 clamping spring
20 film handling device
30 drive device
32 cam disc
33 drive shaft
34 pick-up
36 bearing axis
37 lever
40 film
42 pouch
44 leg
45 fold
50 transport wheel
52 clamping arm
100 sealing station
102 lower sealing jaw
104 sealing jaw element
106 sealing jaw element
108 upper sealing jaw
110 counter jaw element
112 counter jaw element
113 long leg
114 short leg
115 drive
116 drive shaft
118 counter jaw connecting rod
120 sealing jaw connecting rod
122 pivot point
124 sealing jaw pivot arm
126 sealing jaw pivot axis
128 counter jaw pivot arm
130 counter jaw pivot axis
140 drive
142 drive shaft
144 wall
150 wrapping
A symmetry axis
E sealing plane
L longitudinal seal
Q transverse seal
I-VI position of the receptacle 4

The invention claimed is:

1. Device for manufacturing a pouch containing a brewable material accommodated in a wrapping, comprising a pouch manufacturing device adapted to manufacture a water-permeable pouch containing brewable material, and comprising a sealing station with two sealing jaws movable relative to one another for sealing the pouch in the wrapping placed in a U-shape around the pouch, wherein the sealing jaws are configured to form longitudinal seals lying opposite one another and a transverse seal extending transversely thereto on the wrapping, wherein at least one sealing jaw comprises first and second sealing jaw elements each configured to form one of the longitudinal seals and a segment of the transverse seal.

2. Device according to claim 1, wherein the first or second sealing jaw element is fixed to a sealing jaw pivot arm, a pivot axis of which is aligned obliquely to the longitudinal seals and the transverse seal.

3. Device according to claim 2, wherein the sealing jaw pivot arm is eccentrically connected via a connecting rod to a drive shaft which is aligned parallel to the pivot axis.

4. Device according to claim 2, wherein assigned to the first or the second sealing jaw element for pressing the wrapping is a counter jaw element interacting with the first or second sealing jaw element, which counter jaw element is attached to a counter jaw pivot arm, a pivot axis of which is aligned obliquely with respect to the longitudinal seals and the transverse seal, in that the pivot axis of the sealing jaw pivot arm and the pivot axis of the counter jaw pivot arm are arranged on opposite sides of pivot points at which a sealing jaw connecting rod engages on the sealing jaw pivot arm or a counter jaw connecting rod engages on the counter jaw pivot arm, wherein the sealing jaw connecting rod and the counter jaw connecting rod are each connected eccentrically to a common drive shaft.

5. Device according to claim 2, wherein both the first and the second sealing jaw element or a respective first and second counter jaw element cooperating with the first or second sealing jaw element are eccentrically connected via a connecting rod to a drive shaft which is aligned parallel to the pivot axis.

6. Device according to claim 2, wherein both the first and the second sealing jaw element or a respective first and second counter jaw element cooperating with the first or second sealing jaw element are assigned to a counter jaw element interacting with the first or second sealing jaw element, which counter jaw element is attached to a counter jaw pivot arm, a pivot axis of which is aligned obliquely with respect to the longitudinal seals and the transverse seal, in that the pivot axis of the sealing jaw pivot arm and the pivot axis of the counter jaw pivot arm are arranged on opposite sides of pivot points at which a sealing jaw connecting rod engages on the sealing jaw pivot arm or a counter jaw connecting rod engages on the counter jaw pivot arm, wherein the sealing jaw connecting rod and the counter jaw connecting rod are each connected eccentrically to a common drive shaft.

7. Device according to claim 1, wherein a counter jaw element cooperating with the first or second sealing jaw element and assigned to the first or the second sealing jaw element for pressing the wrapping, wherein the respective first and second sealing jaw element is connected via a sealing jaw connecting rod and the counter jaw element is connected via a counter jaw connecting rod in each case eccentrically to a common drive shaft.

8. Device according to claim 1, wherein two drive shafts, each driven by a drive unit and each provided for driving one of the first or second sealing jaw elements and a counter jaw element interacting with the respective sealing jaw element for pressing the wrapping, are aligned at right angles to one another.

9. Device according to claim 1, wherein both the first and the second sealing jaw element or a respective first and second counter jaw element cooperating with the first or second sealing jaw element are fixed to a sealing jaw pivot arm, a pivot axis of which is aligned obliquely to the longitudinal seals and the transverse seal.

10. Device according to claim 1, wherein both the first and the second sealing jaw element or a respective first and second counter jaw element cooperating with the first or second sealing jaw element are assigned to the first or the second sealing jaw element for pressing the wrapping wherein the first or second sealing jaw element is connected via a sealing jaw connecting rod and the first or second counter jaw element is connected via a counter jaw connecting rod in each case eccentrically to a common drive shaft.

* * * * *